United States Patent [19]

Kamimura et al.

[11] Patent Number: 5,251,133
[45] Date of Patent: Oct. 5, 1993

[54] REFERENCE POINT RECOGNITION APPARATUS FOR THE STEERING CONTROL SYSTEM OF A VEHICLE

[75] Inventors: Kenji Kamimura; Sadachika Tsuzuki, both of Saitama, Japan

[73] Assignee: Honda Giken Kogyo Kabushiki Kaisha, Tokyo, Japan

[21] Appl. No.: 683,730

[22] Filed: Apr. 11, 1991

[30] Foreign Application Priority Data

Apr. 20, 1990 [JP] Japan .................................. 2-104449

[51] Int. Cl.$^5$ ............................................ G06F 15/50
[52] U.S. Cl. .............................. 364/424.02; 180/167; 356/152
[58] Field of Search ............... 364/424.01, 424.02, 364/443, 449; 180/167, 168, 169; 250/560, 561; 358/103; 318/568.12, 587; 356/1, 141, 152, 375

[56] References Cited

U.S. PATENT DOCUMENTS

| | | | |
|---|---|---|---|
| 4,309,758 | 1/1982 | Halsall et al. | 364/424.02 |
| 4,328,545 | 5/1985 | Halsall et al. | 364/443 X |
| 4,558,215 | 12/1985 | Kaneko et al. | 250/222.1 |
| 4,700,301 | 10/1987 | Dyke | 364/424.02 |
| 4,796,198 | 1/1989 | Boultinghouse et al. | 364/424.02 X |
| 4,947,324 | 8/1990 | Kamimura et al. | 364/424.02 |
| 5,008,557 | 4/1991 | Nojio et al. | 250/561 |
| 5,014,204 | 5/1991 | Kamimura et al. | 364/449 |
| 5,020,620 | 6/1991 | Field | 180/169 |
| 5,031,101 | 7/1991 | Kamimura et al. | 364/424.02 |
| 5,068,795 | 11/1991 | Kamimura et al. | 364/449 |
| 5,076,690 | 12/1991 | de Vos et al. | 356/152 |
| 5,137,354 | 8/1992 | de Vos et al. | 356/152 |
| 5,170,350 | 12/1992 | Kamimura et al. | 364/424.02 |

*Primary Examiner*—Thomas G. Black
*Assistant Examiner*—Thomas S. Auchterlonie
*Attorney, Agent, or Firm*—Pollock, Vande Sande & Priddy

[57] ABSTRACT

A reference point recognizing system for a steering control system comprising a light beam scanner and a beam receiver on a moving vehicle, the light beam scanner scanning a light beam generated in a light beam generator in the circumferential direction while vertically swinging it. The system determines azimuths of light from light reflector reference points detected in the beam receiver in response to the light beam scan prior to the traveling of the moving vehicle. A memory stores the azimuths of the lights and the number of times each of lights are detected. The system determines when the detection of lights in particular azimuths has reached a predetermined number, recognizes when an incident light is detected from substantially the same direction a predetermined number of times or more, and treats that substantially same direction as the azimuth of a predetermined light reflecting means.

8 Claims, 11 Drawing Sheets

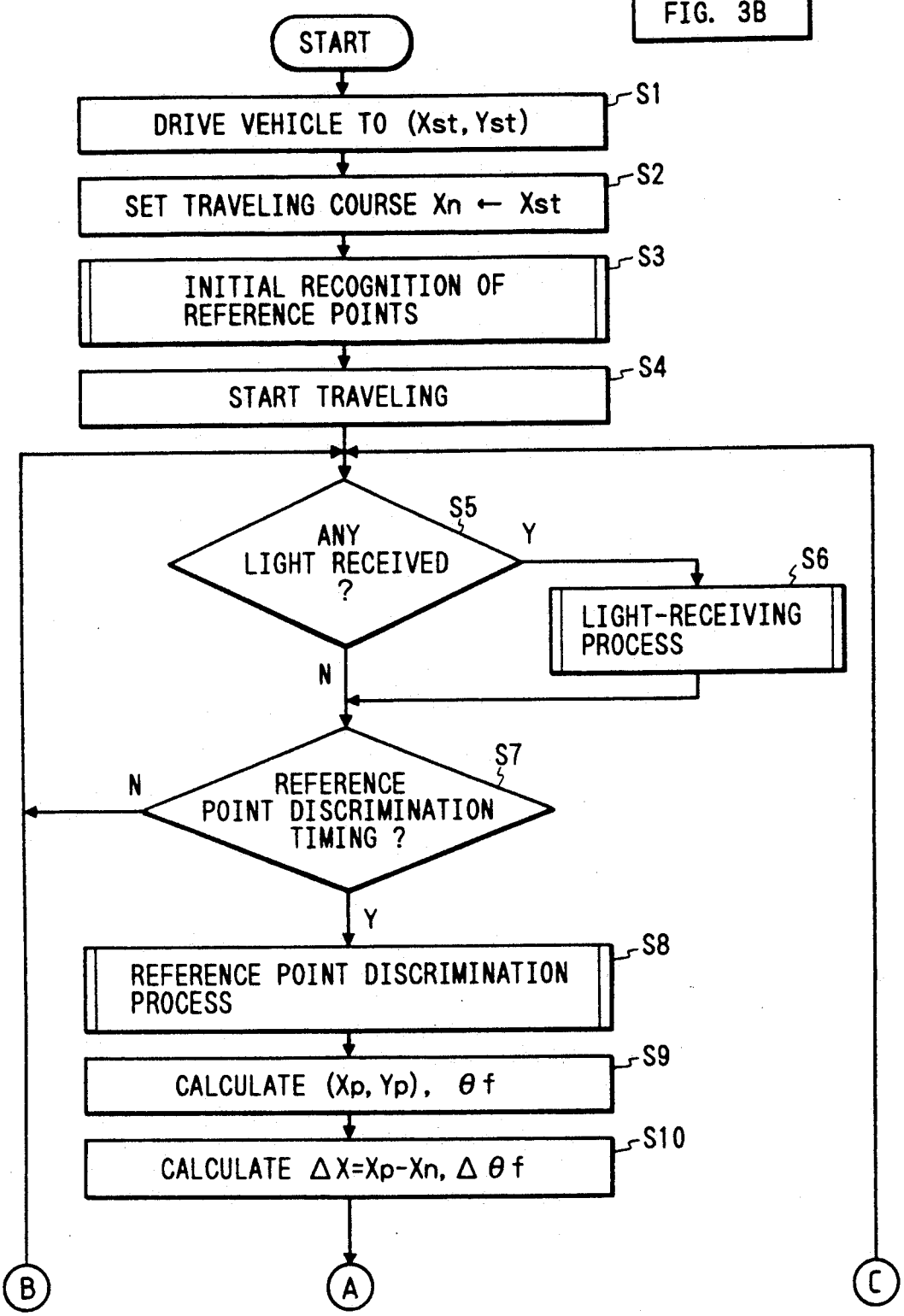

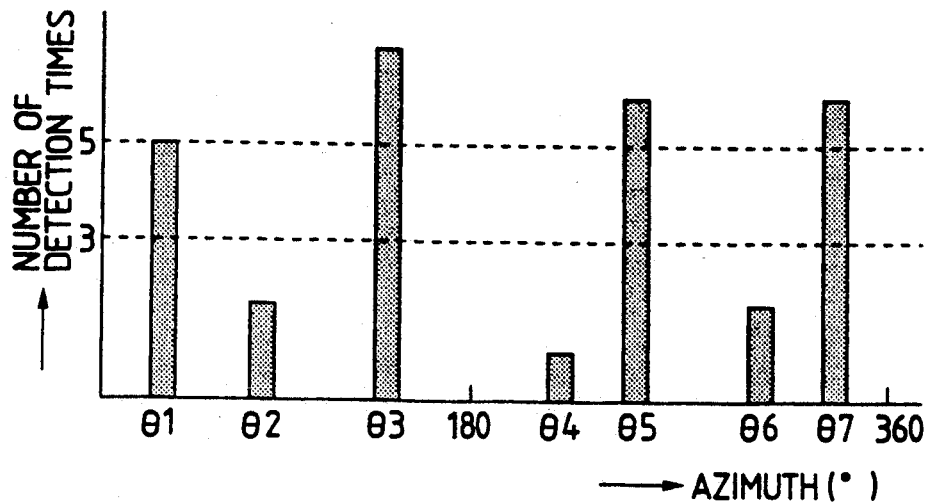

REFERENCE POINT RECOGNITION APPARATUS FOR THE STEERING CONTROL SYSTEM OF A VEHICLE

BACKGROUND OF THE INVENTION

1. Field of the Invention

The present invention relates to a steering control system for use in a moving vehicle, and more particularly to a steering control system for use in a moving vehicle such as a moving automobile, an unmanned mobile and carrying device in a factory, or an automated vehicle for use in agriculture, civil engineering machinery and the like.

2. Description of the Prior Art

Heretofore, as a system for detecting a current position of a moving body such as the moving vehicles described above, there has been proposed a system provided with a means for scanning a light beam emitted from a beam source on a moving body in the circumferential direction or every azimuthal directions around the moving body, retro-reflective means for reflecting to return the light beam in the direction of incident light which are secured at at least three positions apart from the moving body, and a beam receiver means for receiving light reflected from the retroreflective means (Japanese Patent Laid-open No. 67476/1984).

In the above mentioned prior art, differential azimuths between adjoining two of the at least three retroreflective means around the moving body, or included angles formed by the adjoining two of said at least three retroreflective means with the moving body are detected on the basis of received beam outputs of the light-receiving means, and then the position of the moving body is calculated on the basis of the detected differential azimuths and positional information of the retroreflective means which have been previously set.

In the above described system, however, there has been such a case where a light beam emitted from a beam source mounted on the moving vehicle could not be directed to the retroreflective means positioned at reference points because of an inclination or vibration of the moving vehicle, or a case where the light-receiving means on the moving vehicle receives light reflected from the objects other than the expected retroreflective means.

When real reflected light is not positively received by a light-receiving means, the position of the moving vehicle is erroneously calculated so that the moving vehicle cannot be traveled along a prescribed course.

To solve the problem mentioned above, there has been proposed a system in which a light beam is scanned in the circumferential direction around a moving vehicle while it is vertically swung, whereby the light beam can move reliably be irradiated to a predetermined light reflecting means even if the moving vehicle inclines (Japanese Patent Publication No. 41489/1988).

In addition, there is a light beam scanning system in which a plurality of light beams are simultaneously scanned in the different circumferential directions corresponding to the individual light reflecting means by a plurality of light beam scanning devices which can freely swing the plurality light in the vertical directions, whereby the missing of the light reflecting means is made as little as possible (Japanese Patent Application Laid-Open No. 242313/1985).

In the former system, if the scanning speed in the circumferential direction is high as compared with the swing speed in the vertical directions, the pitch of the locus of the light beam in the circumferential scanning direction becomes rough. That is, the locus of the light beam in this system is a periodic wave-like locus which is a composite of the circumferential scanning and the vertical scanning or swing; therefore, the wavelength of the wave-like locus becomes long if the circumferential scanning speed is high as compared with the vertical swing speed. Moreover, if the light reflecting means happens to be positioned between two locus lines adjoining each other, the light beam cannot be irradiated on a predetermined light reflecting means. The vertical scanning density of the light beam can be enhanced by reducing the circumferential scanning speed, but there is a problem that the amount the moving vehicle moves during a one-rotation scanning time increases for that reduction and the precision of detecting the position of the moving vehicle decreases.

In the latter system, although the problem of the circumferential scanning speed is somewhat improved, it is required to provide a plurality of light beam scanning means, which causes another problem, i.e., the signal processing therefor is complex and the system also becomes expensive.

Because of such actual circumstances it is extremely difficult to prevent the missing of a predetermined light reflecting means or object to be detected, and it is often required to accurately recognize that the missing of a reference point has occurred and to appropriately treat for the missing. The present applicant has proposed several reference point discrimination processing methods for determining whether the predetermined light reflecting means or object can be detected or it has been missed.

There is the following method as an example of such reference point discriminating processing methods. That is, based on the azimuth of the light reflecting means detected up to the present time, the azimuth in which the same light reflecting means is to be detected in the next scan is predicted, and if there is a light signal received in the predicted azimuth, the detected azimuth of the received light signal is assumed to be the azimuth in which the predetermined light reflecting means exists, and the detected azimuth is used for the steering control of the moving vehicle. On the other hand, if no light signal is detected in the predicted azimuth, said light reflecting means is judged to have been missed. Then the predicted azimuth is assumed to be the azimuth of the missing light reflecting means, and it is used for the steering control.

In the above reference point discrimination process, the disposed light reflecting means are sequentially discriminated in the rotation direction by the rotary scanning of one light beam. For that, it is necessary to recognize the azimuths of all the predetermined light reflecting means prior to the running of the vehicle.

However, in the above-mentioned system in which a light beam is scanned in the circumferential direction while it is vertically swung, even if it is desired to recognize the azimuth of each light reflecting means prior to the running of the moving vehicle, the light beam cannot be irradiated on the light reflecting means when the light reflecting means is positioned between the two adjoining wave-like scanning locus lines of the light beam, and thus the light reception sequence is different from the sequence in which the light reflecting means are actually disposed, so that the respective light reflecting means cannot correspond to the azimuths measured.

SUMMARY OF THE INVENTION

It is the object of the present invention to provide a steering control system for a moving vehicle wherein the recognition of the azimuths corresponding to all of the light reflecting means prior to the traveling is facilitated when scanning is performed in the circumferential direction while vertically swinging the light beam.

The present invention has a first characteristic feature in the construction comprising: a light beam scanning means and a beam receiving means provided in a vehicle, the light beam scanning means scanning the light beam generated in a light beam generating means in the circumferential direction while vertically swinging it, means for detecting azimuths of the lights detected in the beam receiving means in response to the light beam scan performed prior to the traveling of the vehicle, a memory means for storing the azimuths of the lights and the number of times each of lights are detected, means for detecting that the detection of the lights in particular azimuths stored in the storage means has reached a predetermined number of times, and means for recognizing, when an incident light is detected from substantially the same direction a predetermined number of times or more, the substantially same direction in which the incident light has been detected as the azimuth of a predetermined light reflecting means as seen from the vehicle.

In addition to the above-mentioned construction, the present invention has a second characteristic feature in comprising means for recognizing the azimuths as the actual azimuths of the respective light reflecting means, when the number of the azimuths in each of which the light is detected by the light receiving means is equal to one of the disposed light reflecting means.

In the present invention having the above-mentioned construction, when an incident light is detected by a predetermined number of times or more in one rotation of scanning from the respective directions corresponding in number to the disposed light reflecting means, it is determined that the lights reflected from the predetermined light reflecting means have been all detected. That is, if a light beam is scanned while it is vertically swung, the frequency of the detection of the light reflected from a predetermined light reflecting means is usually higher than that of the detection of the light reflected from other unexpected reflecting object or a light emitted by a wrong object, as long as there is no reflecting object similar to the predetermined light reflecting means around the traveling area of the moving vehicle. Accordingly, even if the light reflected from any other reflecting object or the light emitted by the wrong object is exceptionally detected, it can be determined that the azimuths or the directions in which the lights are detected first by a predetermined number of times or more are the directions in which the light reflecting means are disposed.

BRIEF DESCRIPTION OF THE DRAWINGS

FIG. 3 constituting FIGS. 3A and 3B is a flowchart of steering control for a moving vehicle;

FIG. 7 is an explanatory diagram of the method for recognizing the reflectors;

FIG. 12 shows an example of the memory format of the first azimuth memory.

DETAILED DESCRIPTION OF THE PREFERRED EMBODIMENTS

Figure 11:
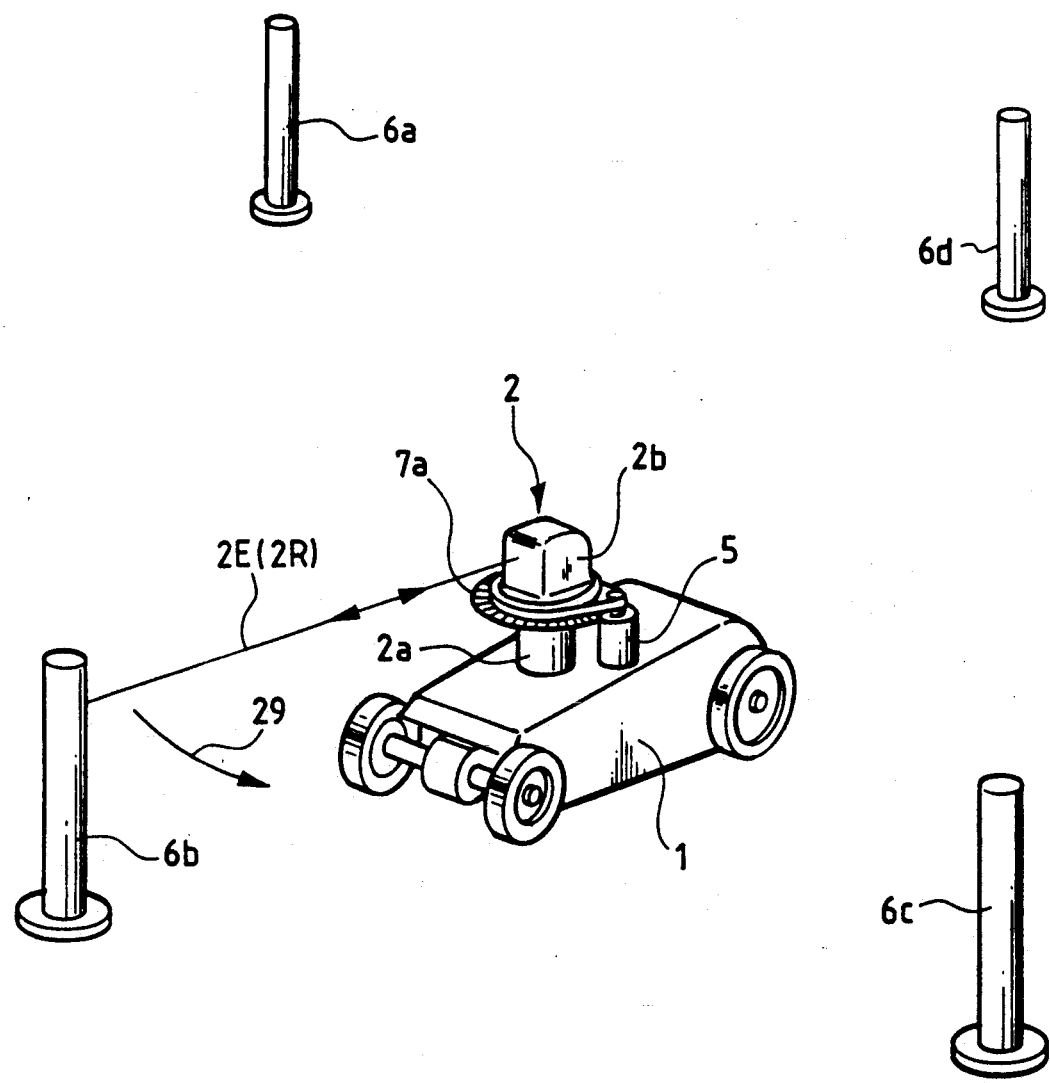
FIG. 11 is a perspective view showing the arrangement of the moving vehicle and the reflectors.

An embodiment of the present invention will be described hereinbelow by referring to the accompanying drawings. FIG. 11 is a perspective view showing a state of arrangement in respect of a moving vehicle carrying the control system according to the present invention and each of light reflectors disposed in an area in which the moving vehicle travels.

In FIG. 11, the moving vehicle 1 is one for use in agricultural working such as a lawn mower and the like.

Optical scanner 2 is mounted on the moving vehicle 1. The optical scanner 2 consists of a stationary portion 2a and a rotary portion 2b, and the rotary portion 2b is coupled with a motor 5 and driven by the motor 5 to rotate, for instance, in the counterclockwise direction. Light beam 2E generated by a light beam source in the optical scanner 2 is scanned in the direction of arrow 29 as the rotary portion 2b rotates. In addition, the rotary portion 2b contains a swing mechanism for scanning the generated light beam in the vertical direction.

A plurality of reference points are set around the work area, and at the reference points, reflectors 6a-6d consisting of well-known retroreflective means such as corner cube prisms are placed which comprise a reflecting surface that reflects the incident light to the direction of incidence thereof. A light beam 2E scanned by the optical scanner 2 in the direction of arrow 29 is sequentially reflected by these reflectors, and a reflected light 2R is sequentially detected by the beam receiver in the optical scanner 2. The light beam source consists of a light emitting diode and the beam receiver consists of a photodiode.

The rotary portion 2b is provided with a slit board 7a which rotates along with the rotary portion 2b. By providing an angle sensor which outputs a pulse signal each time it detects the slit of the slit board 7a, a rotating angle of the rotary portion 2b can be detected on the basis of a counted value of the pulse.

As the mechanism for vertically scanning a light beam, the mechanism found in the specification of the Japanese Patent Application Serial No. 2-33444 and any other well-known swing mechanism can be employed. Although the optical scanner 2 is shown as it is exposed for explanation, it has of course a cover for dust or drip proof protection.

With the aforesaid construction, the light beam 2E generated in the light beam source of optical scanner 2 is scanned in the scan direction 29 and sequentially reflected at reflectors 6a, 6b, 6c and 6d, respectively. The reflected lights are detected in a beam receiver of the optical scanner 2 in the same order, and based on the detected signals, the current position of the moving vehicle 1 with respect to the reflectors 6s-6d is detected to perform the steering control.

The method for recognizing the reflectors 6a-6d on the basis of the light signals detected in the beam receiver before causing the moving vehicle to travel will be outlined hereinafter. FIG. 7 is an explanatory diagram of the recognition method.

In the same figure, the ordinate axis represents the rotating angle or azimuth of the rotary portion 2b, and the abscissa axis represents the number of times each of the light signals is detected. It is assumed in FIG. 7 that lights in seven azimuths $\theta 1$-$\theta 7$ were detected during a predetermined number of light beam scans. In the example shown in the diagram, the numbers of times four light signals were detected in azimuths $\theta 1$, $\theta 3$, $\theta 5$ and $\theta 7$ are equal to or larger than the reference number of times which was set as a threshold value, that is 5, whereas the numbers of times the other three light signals were detected in the other azimuths $\theta 2$, $\theta 4$ and $\theta 6$ are smaller than 3. The numbers of times in azimuths $\theta 1$, $\theta 3$, $\theta 5$ and $\theta 7$ are obviously greater than the other three azimuths $\theta 2$, $\theta 4$ and $\theta 6$. Since reflectors are provided at four positions, it is determined that the azimuths $\theta 1$, $\theta 3$, $\theta 5$ and $\theta 7$ are the ones in which the predetermined reflectors are disposed.

Thus, in the present embodiment, when a light signal is detected a predetermined number of times or more in the different azimuths the number of which is equal to the number of the disposed reflectors, it is determined that the different azimuths are those in which the predetermined reflectors exist.

Now, the reference point discrimination process is described which determines whether or not the light detected in the beam receiver 3b is that from a predetermined reflector during the traveling of the moving vehicle 1.

Figure 8:
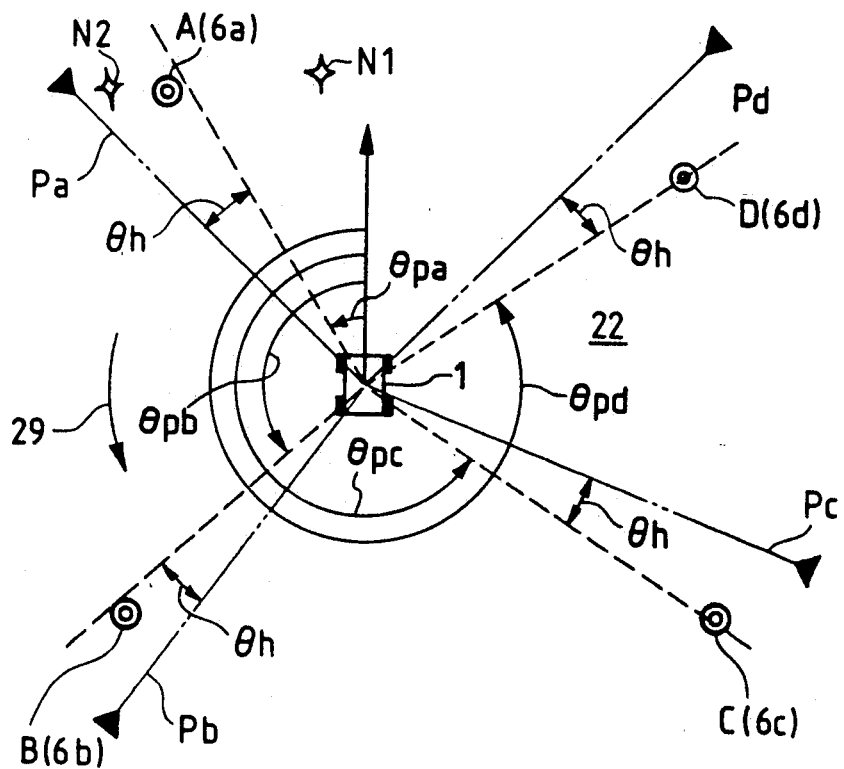
FIG. 8 is a representation for explaining the reference point discrimination process.

FIG. 8 is a representation for explaining the reference point discrimination process. In the same figure, the four reflectors 6a-6d are respectively disposed at the four reference points A-D around a work area 22. An arrow 29 represents the scan direction of the light beam emitted from the moving vehicle 1.

In the moving vehicle 1, the azimuth of each reference point as seen from the moving vehicle 1 is calculated on the basis of the light signal detected by the light beam receiver 3b, and the azimuths of the reference points to be detected in the next scan are predicted on the basis of the azimuths which have been detected up to the present time. A practical method for the azimuth prediction will be described hereinafter by referring to FIG. 4.

The predicted azimuths are represented by angles $\theta pa$-$\theta pd$. Reference point discrimination azimuths pa-pd are provided at the respective azimuths which are advanced by an angle $\theta h$ beyond the respective predicted azimuths $\theta pa$-$\theta pd$ in the light beam scan direction. Every time the scans for the reference point discrimination azimuths pa-pd proceed, the incident light from the direction nearest the predicted azimuth of the lights detected in the horizontal angle range from the preceding reference point discrimination azimuth to the current reference point discrimination azimuth is judged to be the light reflected by the reflector placed at the expected reference point.

For instance, it is supposed that, in the range of the current reference point discrimination azimuth pa and the preceding one pd, three light beams from noise sources N1 and N2 and the reflector 6a disposed at reference point A have been detected. In this case, the light from the direction nearest the predicted azimuth $\theta pa$, namely, the light from reference point A can be discriminated from others.

The following processing may be added to improve the discrimination precision of reference points. A predetermined extent of (an angle equal to or less than the angle $\theta h$), or a limited angle range is set before and behind a predicted azimuth, and when the light is out of the extent or range even though the light comes from the direction nearest the predicted azimuth, it is determined that the expected reference point has been missed. When it is determined that the expected reference point has been missed while moving vehicle 1 is traveling on a straight traveling course, the position of moving vehicle 1 in the current process cycle is calculated using the predicted azimuth, and the said predicted azimuth or a new azimuth obtained by adding the said predicted azimuth and a predetermined angle is further stored as a new predicted azimuth for the next process cycle.

A fundamental principle for detecting the position and the advance direction of the moving vehicle 1 in accordance with the present embodiment will be described hereinbelow.

Figure 10:
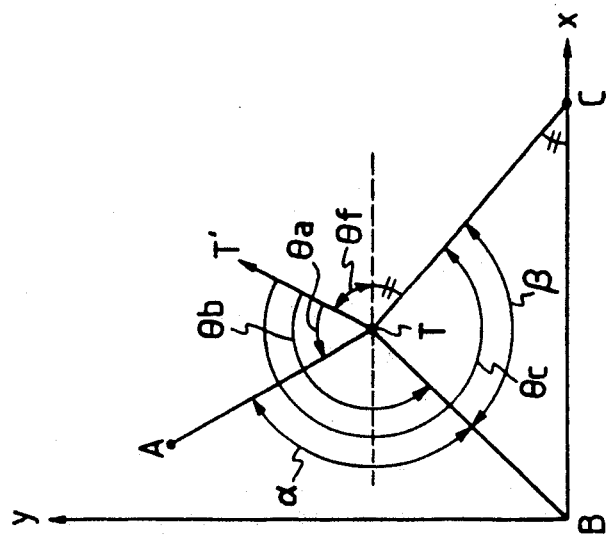
FIG. 10 is a representation for explaining the principle of detecting the advance direction of the moving vehicle.
Figure 9:
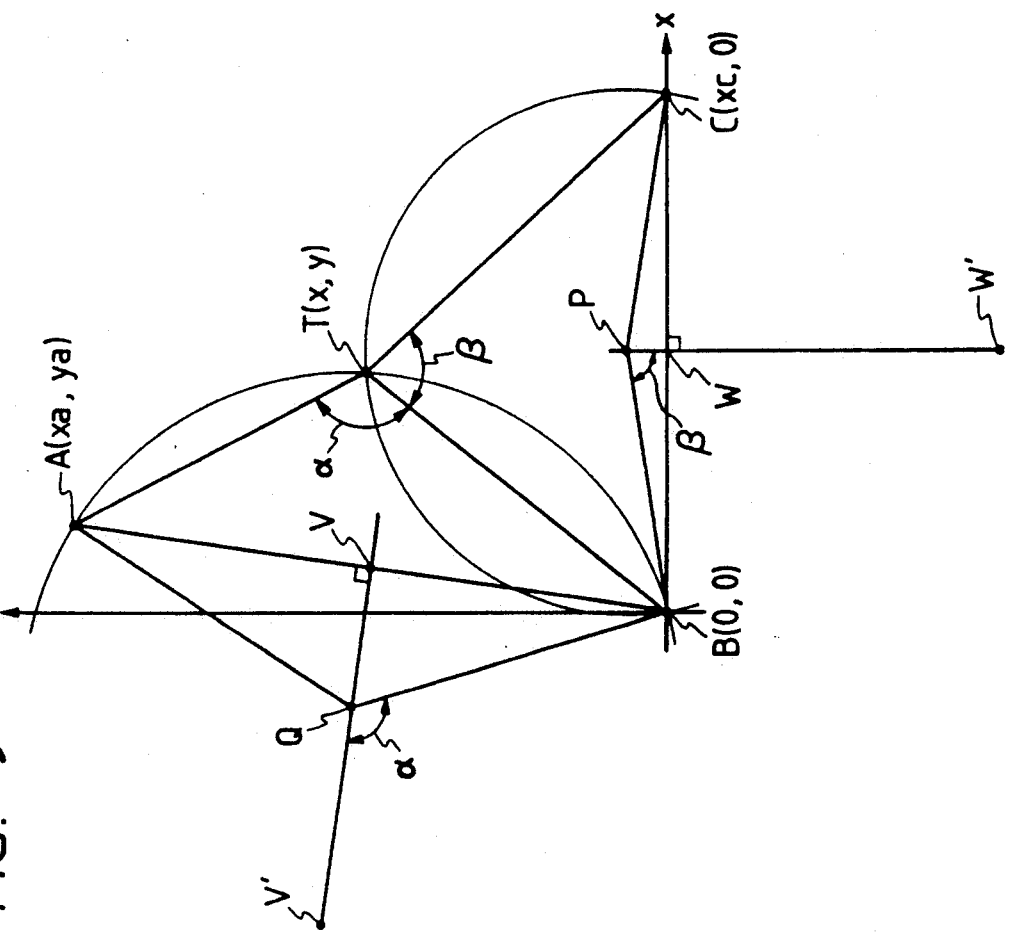
FIG. 9 is a representation for explaining the principle of detecting a position of the moving vehicle.

FIGS. 9 and 10 are explanatory graphical representations each showing the position T of the moving vehicle 1 and those of the reflectors 6 in a coordinate system for indicating the working area of the moving vehicle 1.

In these figures, positions of the reflectors 6a-6c are indicated by points A, B and C. The positions of the reference points and the vehicle 1 are represented by an x-y coordinate system wherein the reference point B is the origin, and a line extending between the reference points B and C is the x-axis. The current position of the moving vehicle 1 is T(x, y) and its advance direction with respect to the x-axis is $\theta f$. As is apparent from FIG. 9, the position T of the moving vehicle is on a first circumscribed circle Q for a triangle ATB as well as a second circumscribed circle P for a triangle BTC. Accordingly, when the two points of intersection of the two circumscribed circles Q and P for the triangles ATB and BTC are calculated, the position of the moving vehicle 1 is fixed.

In this case, since the reflector 6b is the origin, the other intersection T of the two circumscribed circles P and Q is calculated in accordance with an appropriate procedure so that the position of the moving vehicle 1 is found. The fundamental principle and the calculation equations are fully described in U.S. patent application Ser. No. 344,574 (now U.S. Pat. No. 5,011,288 issued Apr. 30, 1991) and U.S. Pat. No. 4,947,324.

Furthermore, the advance direction of the moving vehicle 1 is calculated as follows. In FIG. 10, assuming that an angle between the advance direction TT' of the moving vehicle 1 and the x-axis is $\theta f$, and the differential azimuths of the reference points A, B and C with respect to the advance direction TT' as reference are, respectively, $\theta a$, $\theta b$ and $\theta c$, it gives the following equation, $$\theta f = 360° - \tan^{-1}\{y/(xc-x)\} - \theta c \ldots \quad (1)$$

Figure 1:
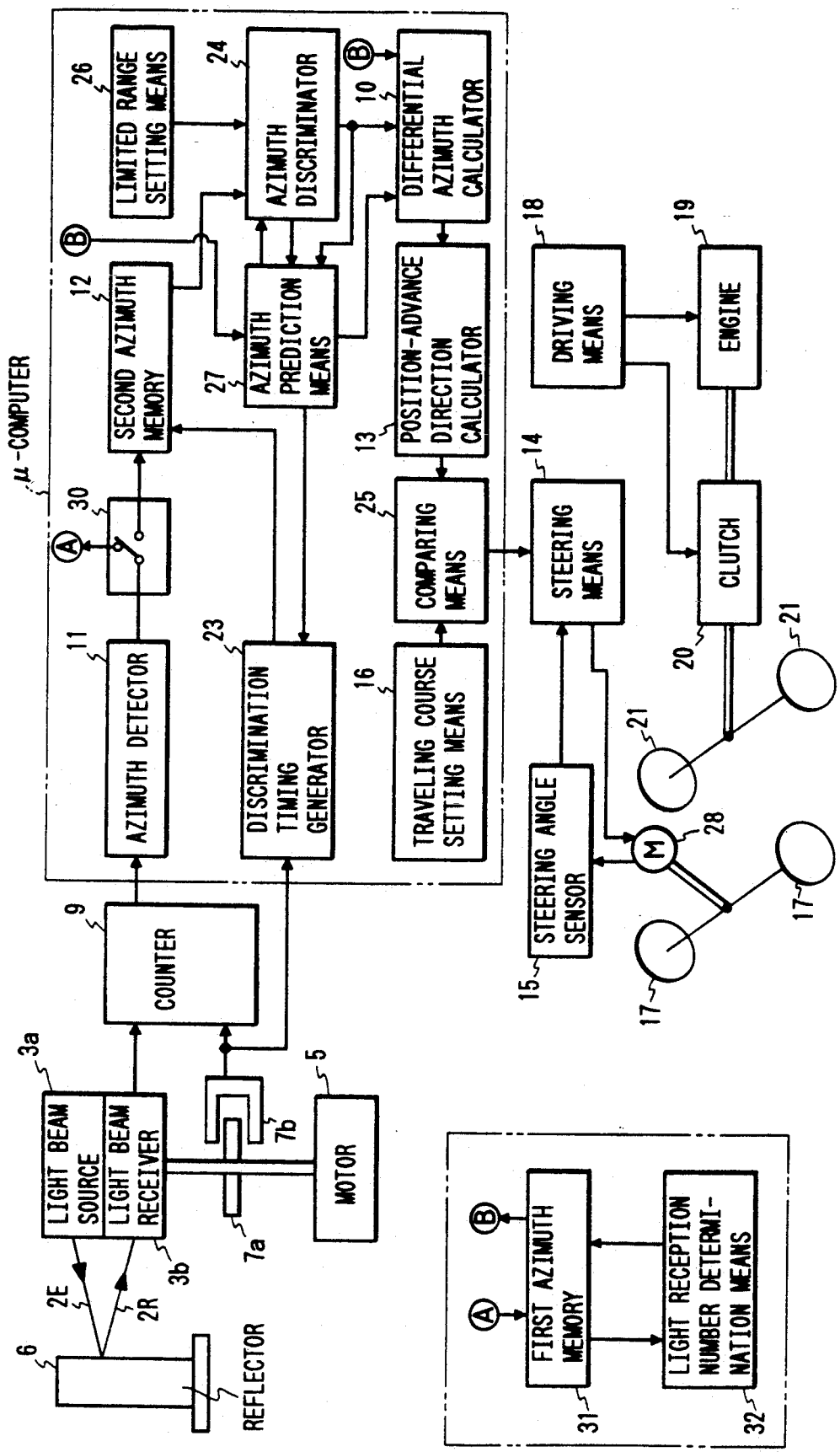
FIG. 1 is block diagram showing the functions of an embodiment of the present invention.

The position T and the advance direction TT' of the vehicle 1 is calculated in the position-advance direction calculator 13 shown in FIG. 1.

Figure 6:
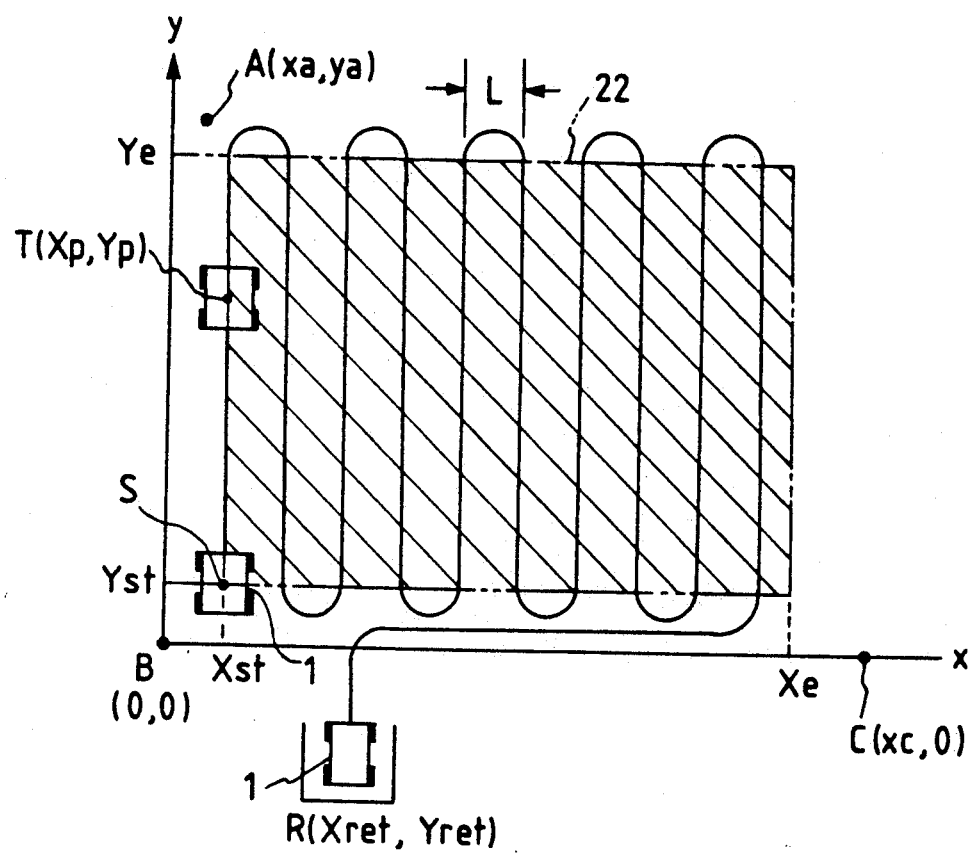
FIG. 6 is a representation showing the arrangement of the traveling course of the moving vehicle and the reflectors.

Next, steering control for the moving vehicle 1 will be described hereinbelow. FIG. 6 is a schematic diagram showing a traveling course of the moving vehicle 1 and the coordinates of the reference points A, B and C. The current position T and the working area 22 of the moving vehicle 1 are represented by the x-y coordinate system. (Xret, Yret) indicate coordinates of a returning position R of the moving vehicle 1, and the working area 22 is a quadrilateral region including four apexes of the points represented by four coordinates (Xst, Yst), (Xst, Ye), (Xe, Yst) and (Xe, Ye). In this case, the current position of the moving vehicle 1 is represented by T(Xp, Yp).

The moving vehicle 1 starts to travel at work start position S, and sequentially travels along straight traveling courses and turning courses for moving from one straight traveling course to the next straight traveling course, performing a predetermined work such as lawn moving.

The start points of turning in the forward direction (the upward direction in the drawing) and the backward direction (the downward direction in the drawing) are denoted by Y-coordinates Ye and Yst, respectively. That is, during the straight traveling of moving vehicle 1, a turn is initiated when the Y-coordinate Yp of the moving vehicle 1 becomes Ye or Yst.

The Y-coordinate of the end point of turning is the same as that of the start point of the turning, but since the calculation of the coordinate of moving vehicle 1 cannot be accurately performed, the determination as to whether or not the moving vehicle 1 has reached the end point of turning is not made by the Y-coordinate of the moving vehicle 1, but by the azimuth data of the reference points viewed from the moving vehicle 1.

Examples of the steering control in a turning course and the determination of the end of turing are described in U.S. Pat. No. 4,947,324 and U.S. Pat. Ser. No. 644,497, respectively.

For simplifying the explanation, an example wherein four sides of the working area 22 are parallel to x- or y-axes is shown in FIG. 6, but other directions and/or shapes of the working area may be selected so far as the points A-C are disposed around the working area 22.

The recognition process for the reference points which is performed prior to the running of the vehicle 1 and the control function for the vehicle steering during its travel is described with reference to the block diagram shown in FIG. 1 where the portion surrounded with a chain line can be constituted of a microcomputer.

A switching portion 30 is switched to a first azimuth memory 31 side when the vehicle 1 is stopped, but it is switched to a second azimuth memory 12 side when the vehicle travels. The light beam 2E emitted from the light beam source 3a is scanned in the rotational direction of the rotary portion 2b and reflected by the reflectors 6 (6a-6d). Each light 2R reflected by the reflectors 6a-6d is received at light beam receiver 3b. A counter 9 counts the pulses outputted from an angle sensor 7b in conjunction with the rotation of the slit board 7a in the rotary portion 2b. The pulse count value is transferred to an azimuth detecting means 11 each time the light is detected in the light beam receiver 3b. In the azimuth detecting means 11, the azimuths of reflectors 6a-6d are calculated on the basis of the supplied pulse count value.

In the first azimuth memory 31, the azimuth of the light signal detected while moving vehicle 1 is stopped, and the number of times the light signal is detected in the abovementioned azimuth are stored. That is, if the moving vehicle 1 is stopped, the switching portion 30 is switched to the first azimuth memory 31 side, and the azimuth data detected in the azimuth detector 11 is transferred to and stored in the first azimuth memory 31. An example of the memory format of the first azimuth memory 31 is shown in FIG. 12. As shown in the same figure, the number of times a light signal is received for each azimuth $\theta m$ is formed in a histogram in the first azimuth memory 31. That is, azimuths $\theta 1, \theta 2, \ldots \theta i$ are stored in the order of light signal detection.

If an azimuth calculated in the azimuth detector 11 is substantially the same as azimuth $\theta m$ already stored in the first azimuth memory 31, the number of times light is received for the azimuth $\theta m$ is renewed or added by one.

In a number of light reception times determination means 32, each number of light reception times stored in the first azimuth memory 31 for each azimuth $\theta m$ is compared with a predetermined number of light reception times (threshold value), and the number of azimuths in each of which the light signal has been detected by a number of times equal to or greater than the threshold value is detected. If the number of the azimuths which are detected in such manner matches with the number of previously disposed reflectors, of the azimuths stored in the first azimuth memory 31, those in each of which a light signal has been detected by a number of times greater than the threshold value are determined to be the azimuths of the predetermined reflectors. The determined azimuths are supplied to an azimuth prediction means 27 for predicting the azimuth in which a reflector is to be detected in the next scan during steering control, and to a differential azimuth calculator 10.

When two threshold values having different levels are set, if azimuths in each of which a light signal is detected by a number of times exceeding the two threshold values are determined to be the azimuths of previously disposed reflectors, on condition that the number of azimuths in each of which a light signal is detected by a number of times equal to or greater than the higher threshold value matches with the number of the previously disposed reflectors, and in addition no azimuth other than those azimuths detects a light signal by a number of times greater than the lower threshold value, the predetermined reflector and other wrong reflecting objects or light emitting bodies can be clearly discriminated.

Even when the number of azimuths exceeding the higher threshold value matches the number of disposed light reflectors, if the number of the azimuths exceeding the lower threshold value becomes larger than the number of the light reflectors, then it is decided that the reflectors are unable to be recognized.

The function and operation for steering control based on the positions of the reflectors recognized by the above described function is described below with reference to FIG. 1.

The azimuth detected in the azimuth detecting means 11 is transferred to and stored in the second azimuth memory means 12 when the vehicle 1 is running, and the data which have so far been accumulated in the second azimuth memory means 12 are transferred to azimuth discriminating means 24 in response to the discrimination timing signal supplied from discrimination timing generator means 23.

The discrimination timing signal is outputted when the scanning has proceeded to a direction which has passed by a predetermined angle θh beyond the direction represented by the predicted azimuth that was calculated in azimuth prediction means 27, or when the scanning of the light beam has proceeded to the reference point discrimination azimuths pa–pd, respectively. The discrimination timing generator means 23 outputs a discrimination timing signal when it has taken in the output pulses of the angle sensor 7b by a predetermined number corresponding to the predicted azimuth calculated in the azimuth prediction means 27 plus the predetermined angle θh.

The azimuth discriminating means 24 judges that the light detected in a direction nearest the predicted azimuth calculated in the azimuth prediction means 27 of the supplied azimuths is that reflected by the reflector at the expected reference point. The azimuth data of the reflector determined by the judgment are utilized when the azimuth of the reflector to be detected in the next scan is calculated in the azimuth prediction means 27. That is, the predicted azimuth is obtained by an experimentally predetermined function of the azimuths which have been determined in the azimuth discriminating means 24. The method of obtaining the predicted azimuth is not limited to the approach based on the predetermined function, but it may be obtained by adding the difference between the azimuths obtained in the current and last cycles by the azimuth discriminating means 24 to the current azimuth.

The azimuths detected in the azimuth discriminating means 24 are inputted to a differential azimuth calculator 10, where each angle defined between the adjoining two retroreflectors 6a–6d, respectively, viewed from the moving vehicle 1, i.e., a differential azimuth is calculated.

In a position-advance direction calculator 13, a current position coordinate of the moving vehicle 1 is calculated on the basis of the detected differential azimuths, so that the advance direction θf of the moving vehicle 1 is calculated based on the azimuths and the current position. The results of the calculation are inputted to a comparing means 25. In the comparing means 25, data indicating a traveling course previously set in a traveling course setting means 16 are compared, respectively, with the coordinates (Xp, Yp) and the advance direction θf of the moving vehicle 1 obtained in the position-advance direction calculator 13.

The comparison result including a x-axis deviation Δx from the predetermined traveling course and an angular deviation Δθf is transferred to a steering means 14. In the steering means 14, a steering motor (M) 28 connected to front wheels 17 of the moving vehicle is driven on the basis of the comparison results. An angle of steering for the front wheels 17 driven by the steering motor 28 is detected by means of a steering angle sensor 15 mounted on the front wheels of the moving vehicle 1, and fed back to the steering means 14. A drive control means 18 controls starting and stopping of an engine 19 as well as operation of a clutch 20 for transmitting the power of the engine 19 to rear wheels 21.

To increase the discrimination accuracy of a reference point, a function may be added for supplying the limited angle range preset in range setting means 26 to the azimuth discriminating means 24, and discriminating whether or not the light detected in the direction nearest the predicted azimuth is in the preset limited angle range. As a result of this discrimination, if the light detected in the direction nearest the predicted azimuth is judged to be in the preset limited range, the differential azimuth is calculated using this azimuth, while if it is out of the preset limited range, the differential azimuth is calculated using the predicted azimuth calculated in the azimuth prediction means 27.

It may optionally be selected depending on the degree of accuracy required in the system, according to the mode or type of the work to be done by the moving vehicle 1, whether only the light within the limited angle range preset in the range setting means 26 is judged to be the light reflected by the expected reference point and the differential azimuth is operated using the azimuth of the incident light, or the differential azimuth is calculated using the azimuth which has been determined without judgment as to whether or not the azimuth of the detected light is in the limited range preset in the range setting means 26.

Figure 3B:
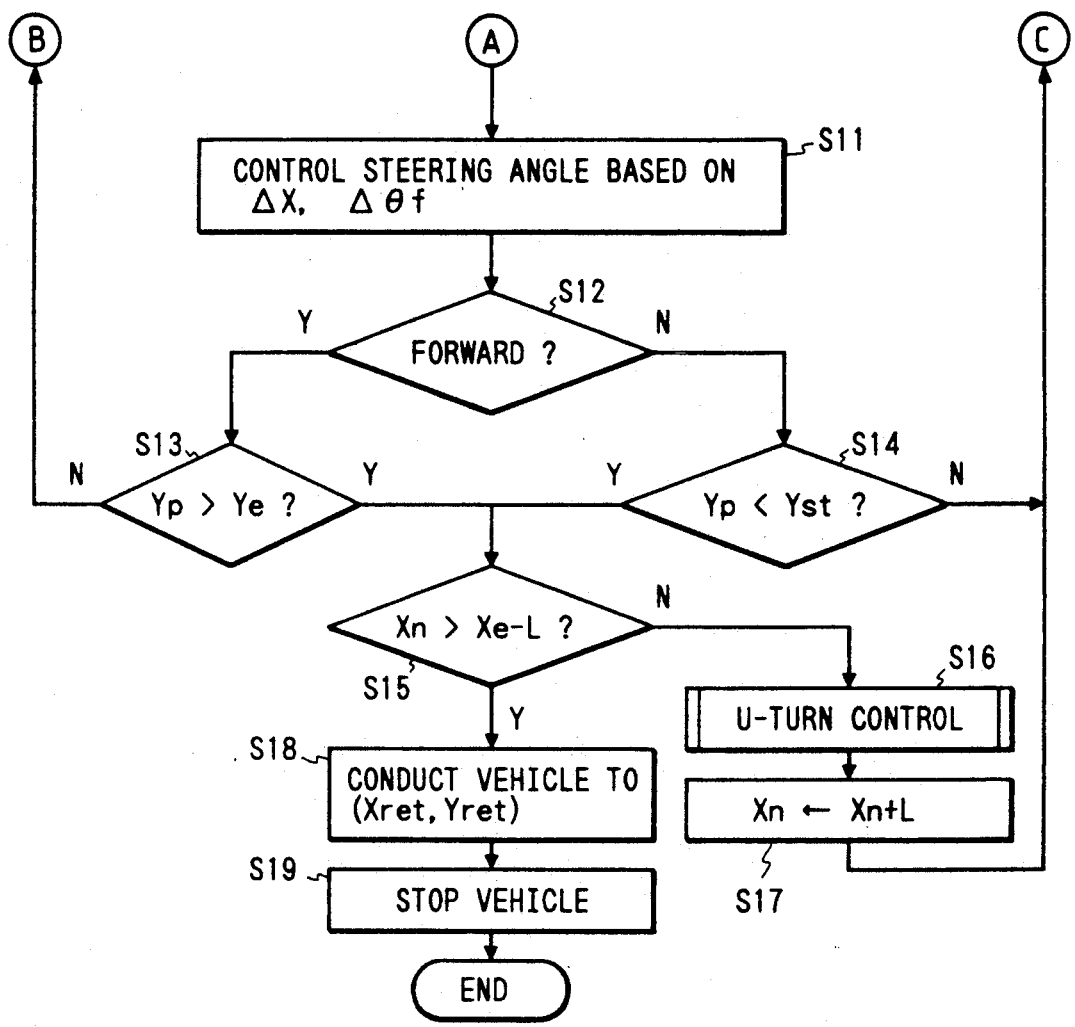

In accordance with the flowchart shown in FIG. 3, a control procedure will be described hereinbelow in which it is assumed that the moving vehicle 1 reciprocates in parallel to y-axis as in the traveling locus of FIG. 6, and the pitch therefor is L.

First of all, in step S1, the moving vehicle 1 is transferred by means of, for example, a radio control from the return point R to the position S where working is started.

In step S2, Xst is set as an X-coordinate Xn for a traveling course thereby to fix the traveling course. In step S3, the vehicle is stopped and the light beam 2E is scanned for the initial recognition process of reference points which will be descibed in detail hereinlater with reference to FIG. 2. Traveling of the moving vehicle 1 is started in step S4.

It is judged in step S5 whether or not light which is reflected by any reference point or light from another wrong light source is received by the beam receiver 3. When light is detected, the operation proceeds to step S6, and a light-receiving process which will be described hereinafter is carried out. When no light is detected, the operation proceeds to step S7.

In step S7, a judgment is made as to whether or not it is the timing for performing a reference point discrimination process determining which one of the received lights is the light from the expected reference point. This judgment is made depending on whether or not the scan has proceeded to one of the reference point discrimination directions pa–pd which are set to advance by the angle θh beyond each of the predicted azimuths θpa–θpd that are calculated in the azimuth prediction means 27.

Steps S5–S7 are repeated until the judgment in step S7 becomes positive, and when the judgment is positive the processing goes to step S8 where the reference point discrimination process is performed as shown in a later described subroutine. If the azimuth of the expected reference point has been determined by the reference point discrimination process, step S9 is entered.

The present position (Xp, Yp) and the advance direction θf of the moving vehicle 1 are calculated in step S9.

In step S10, a deviation amount from the traveling course (ΔX=Xp−Xn, Δθf) is calculated, and the steering angle is controlled in step S11 by the steering means 14 in response to the amount of deviation calculated.

In step S12, it is judged that either the moving vehicle 1 travels towards the direction going away from the origin (forward direction) or the direction approaching the origin (reverse direction) in the y-axial direction. In case of forward direction, it is judged whether one stroke has been finished (Yp>Ye) or not in step S13, while in case of reverse direction, it is judged whether one stroke has been finished (Yp<Yst) or not in step S14. When it is judged that one stroke has not been finished in either step S13 or step S14, the processing returns to step S5.

In case it is judged that one stroke has been finished in either step S13 or S14, it is judged in the following step S15 whether all the strokes have been finished (Xp>Xe−L) or not.

When all strokes have not been finished, the procedure shifts from step S15 to step S16 to effect the U-turn control of the moving vehicle 1. The U-turn control is carried out in accordance with a different method from the one for steering control in a straight traveling course wherein the positional information of the moving vehicle 1 operated by the position-advance direction calculator 13 is fed back to the steering means 14.

More specifically, it is adapted that the vehicle 1 is traveled while fixing a steering angle thereof at a predetermined angle in a turning course, and the moving vehicle returns to steering control in a straight traveling course when at least one of the azimuths of the respective reflectors 6 viewed from the vehicle 1 substantially falls in a predetermined range of corresponding azimuth.

In step S17, a pitch L is added to Xn thereby calculating (Xn+L) and the following traveling course is set. When the following traveling course is set, the procedure returns to step S5 and the above described processings are repeated.

When all strokes are completed, the moving vehicle returns to the return position R(Xret, Yret) in step S18, and the travel thereof is stopped in step S19.

In the present embodiment, since the moving vehicle 1 is moved by radio control to the position S at which the work is started, the initial recognition process of the reference points is performed after the movement. But when the self-position of the moving vehicle 1 is detected first and then the moving vehicle 1 is moved by automatic steering on the basis of that result, the initial recognition process must be performed before the movement.

Figure 2A:
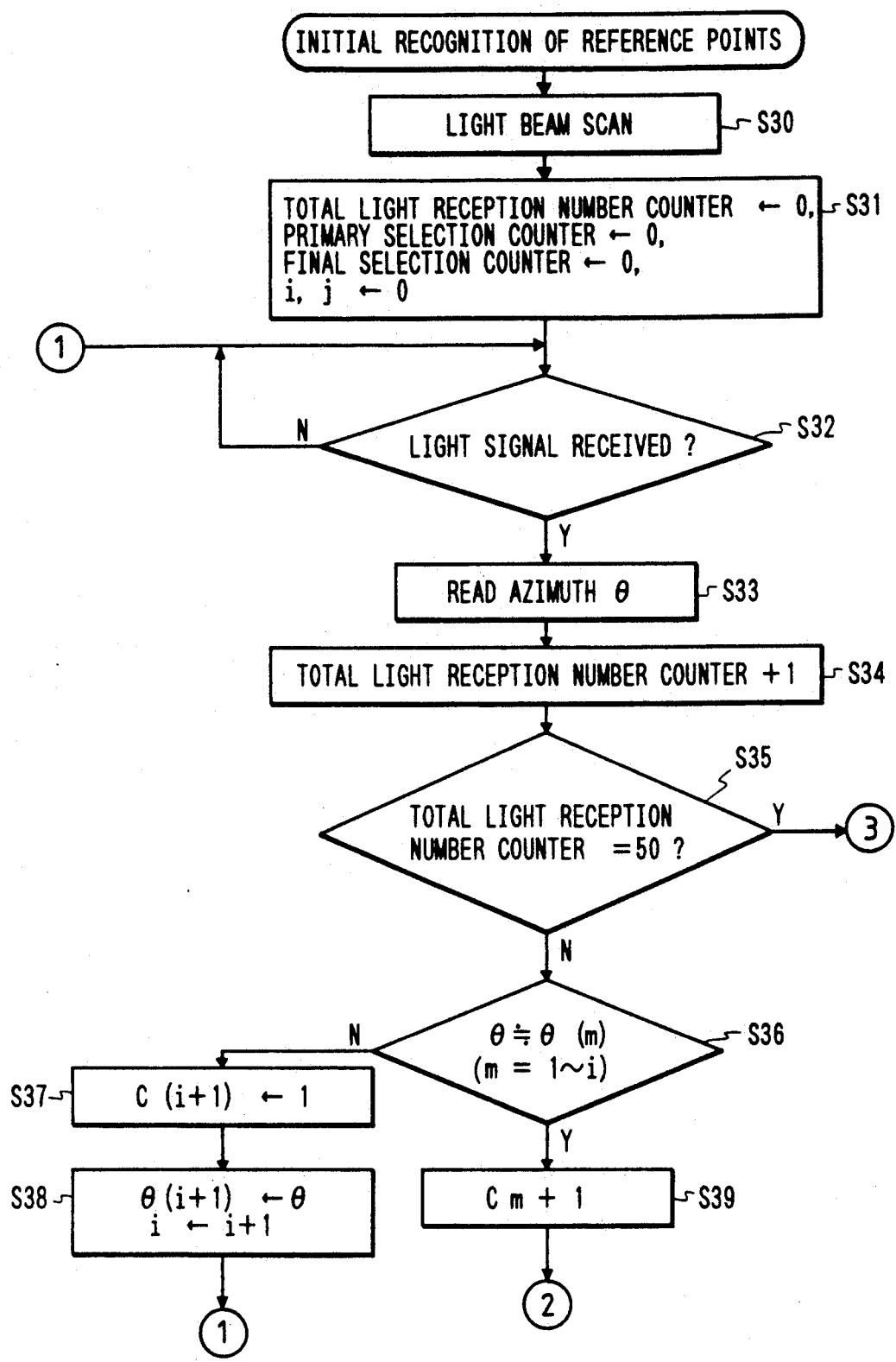
FIGS. 2A and 2B constitute a flowchart of the initial recognition process for the reference points.
Figure 2B:
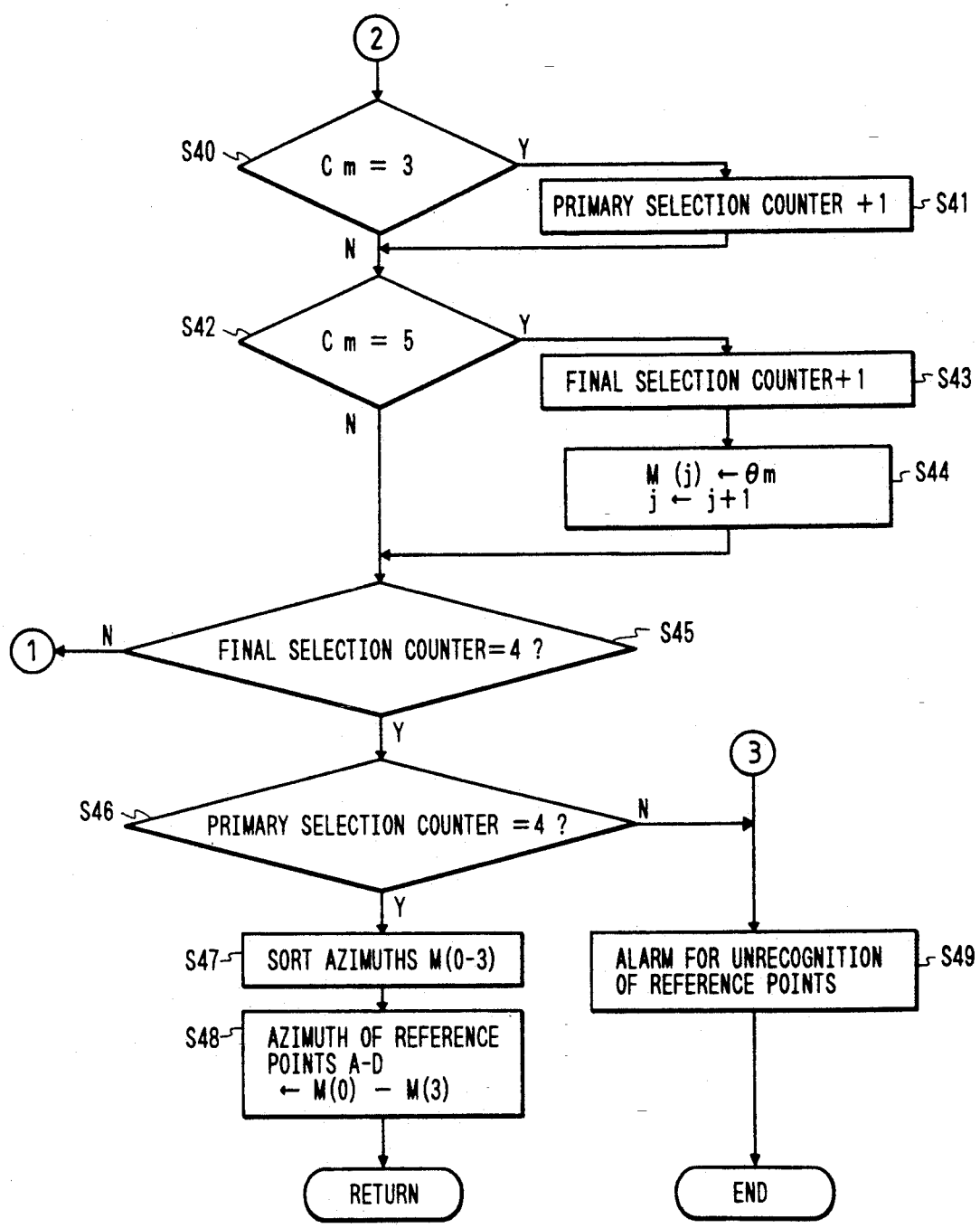

The initial recognition process of the step S3 is now described. FIG. 2 is a flowchart of the initial recognition process.

The rotary portion 2a is driven to vertically swing the light beam while scanning it in the circumferential direction in step S30.

Cleared in step S31 are the count value of a total light reception number counter which counts the total number of light signals detected in the initial recognition process, the count value of a primary selection counter which counts the number of azimuths in each of which the number of light reception times has exceeded the first threshold value, the count value of a final selection counter which counts the number of azimuths in each of which the number of light reception times has exceeded the second threshold value, a parameter i representing the number of the detected azimuths, and a parameter j representing the number of the reference points or the azimuths of the reflectors which are finally recognized.

In step S32, the existence of a light signal is determined. If the light signal exists, the process goes to step S33 where the azimuth $\theta$ of the light signal detected is read in.

In step S34, the value of the total light reception number counter is incremented by one. In step S35, it is determined whether or not the value of the total light reception number counter has reached a predetermined value. In the present embodiment, since the predetermined value is "50", it is determined whether or not the total number of light signals detected has reached "50" in the step S35. The flow proceeds to step S36 until the total light reception times reaches "50".

In step S36, it is determined whether or not the azimuth $\theta$ which has been read in in step S33 is the same as the azimuth $\theta m$ (m is 1 to i) which has already been stored in the first azimuth memory 31. In the present embodiment, the azimuth of ($\theta m \pm 3°$) is determined to be the same as the azimuth $\theta m$.

If no azimuth is stored at all in the first azimuth memory 31, or if an azimuth that is the same as the detected azimuth $\theta$ is not yet stored therein, the light detection in the azimuth $\theta$ is the first time, and thus step S37 is entered where "1" is set to the count value c(i+1) of the first azimuth memory 31, thereby storing that the number of light reception times in the azimuth $\theta$ is 1.

In step S38, the azimuth $\theta$ read in as azimuth $\theta(i+1)$ is stored in the first azimuth memory 31, parameter i is incremented by one, and the process returns to step S32.

If the determination result in step S36 is positive, that is, if a light signal has already been detected in substantially the same azimuth as the detected azimuth $\theta$ and this azimuth was already stored in the first azimuth memory 31, the numbers of storage times of the same azimuth $\theta m$ as the azimuth $\theta$ is renewed.

In step S40, it is determined whether or not the number of storage times of azimuth $\theta m$ has reached the first threshold value "3", and if the determination is positive, the process flows to step S41 where the count value of the primary selection counter is incremented. If the number of storage times of azimuth $\theta$ has not reached the first threshold value "3" or has exceeded "3", the process goes to step S42 where it is determined whether or not the number of storage times of the azimuth $\theta m$ has reached the second threshold value "5" which is larger than the first threshold value.

If the number of storage times of azimuth $\theta m$ has reached the second threshold value "5", the process advances to step S43 where the count value of the final selection counter is incremented by one. Then, in step S44, it is determined that azimuth $\theta m$ is the azimuth of the reflector disposed at a predetermined reference point because the azimuth $\theta m$ has frequently been detected until the second threshold value was reached, and thus it is stored as azimuth M(j), and parameter j is incremented.

In step S45, it is determined whether or not the count value of the final selection counter has reached "4", or the number of the provided reference points. The processings in steps S32 to S45 are repeated until the count value of the final selection counter coincides with the number of the reference points, and when the count value of the final selection counter coincides with the number of the reference points, the process advances to step S46 where it is determined whether or not the count value of the primary selection counter is "4".

If the count value of the preselection counter is "4", that is, the count values of the primary selection and final selection counters are in coincidence, the four azimuths can be determined to be the azimuths of the predetermined reflectors, because it can be determined that the light signals from azimuths other than those four are noises or the like, even if light signals from other directions exist, on the basis that the numbers of light reception times from the four directions are far more than that in the remaining azimuths. If the determination result of step S46 is positive, step S47 is entered where azimuth M(j), or azimuths M(0)–M(3) are sorted in ascending order.

In step S48, it is determined that the azimuths of reference points A to D are azimuths M(0) to M(3), respectively.

If the determination of step S35 is positive, or the determination of step S46 is negative, the process moves to step S49 where a signal is outputted for indicating that the reference points are unrecognizable, and an alarm is sounded and/or displayed according to the signal. The negative determination of step S46 indicates that four azimuths having a remarkably large number of light reception times cannot be specified because the number of the azimuths each of which has a number of light reception times exceeding the first threshold value "3" is greater than the number of azimuths each of which has a number of light reception times exceeding "5". The determination of step S35 becomes positive if no azimuth exists which makes the determination of step S45 positive, regardless of the existence of 50 light receptions, and it is also determined in this case that reference points are unrecognizable.

Now, the light reception process and the reference point discrimination process of the steps S6 and S8 are described.

Figure 5:
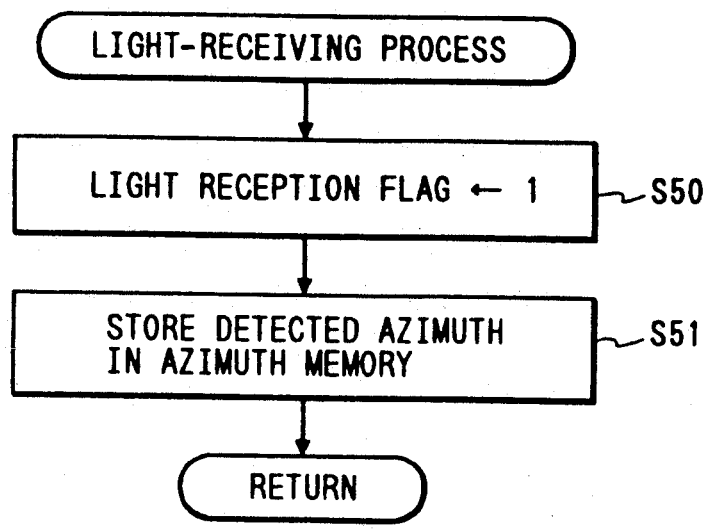
FIG. 5 is a flowchart of the light-receiving process.

The flowchart of the light receiving process is shown in FIG. 5. In step S50, "1" is set in a light reception flag to memorize the detection of light. In step S51, the azimuth of the source of the detected light is stored in the second azimuth memory means 12.

Figure 4:
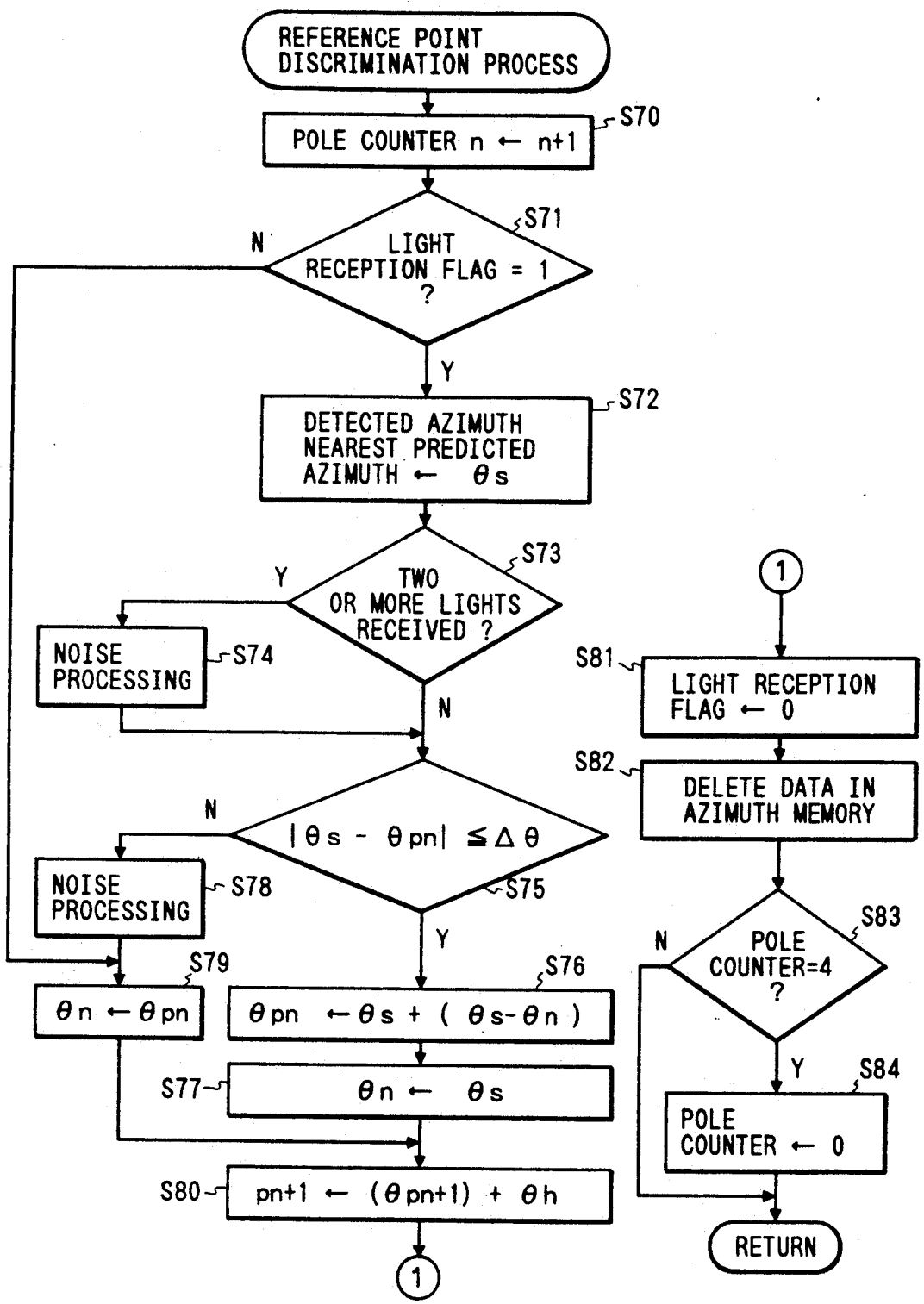
FIG. 4 is a flowchart of the reference point discrimination process.

The flowchart of the reference point discrimination process is shown in FIG. 4 where an example of the procedure is shown for further limiting the detected azimuth nearest the predicted azimuth with the limited angle $\Delta\theta$ preset in the range setting means 26 thereby to more strictly discriminate a reference point.

In step S70, the pole counter value (hereinafter simply referred to as "pole counter") n representing each of the reference points to be discriminated is incremented by one. The pole counters correspond to each of the individual reference points. That is, pole counters "1" to "4" correspond to the reference point A to D, respectively. If the initial value of the pole counter is "0", the pole counter becomes "1" by the processing in step S70, and the reference point corresponding to this value is A. In this embodiment, the initial value is "0".

In step S71, the nature of the light reception flag is determined, and the procedure goes to step S72 if the light reception flag is "1", while it jumps to step S79 if it is "0". In step S72, out of the azimuths of the light sources which have been detected and stored in the second azimuth memory means 12, only the one nearest the predicted azimuth $\theta$pn ($\theta$pa, because the pole counter is now "1") is presumed to be that of the expected reference point and that value is stored as an angle $\theta$s.

In step S73, existence of noises is decided by judging whether or not the number of received light is "2" or more, namely, a plurality of azimuths have been stored in the second azimuth memory means 12. If the decision in the step S73 is positive, the process goes to step S74 assuming that at least one noise has been detected, where the detection of a noise is stored as the noise processing. By the stored noise data, a key to knowing the work environment status is obtained later, whereby it is facilitated to take a suitable step such as removal of noise sources.

If the judgment in step S73 is negative, the flow proceeds to step S75, where a judgment is made as to whether or not the difference between the presumed azimuth $\theta$s and the predicted azimuth $\theta$pn (here $\theta$pa) is smaller than the limited angle $\Delta\theta$. If the difference is larger than the angle $\Delta\theta$, it is judged that the presumed azimuth Os is that of a noise source rather than the expected reference point, and the process goes to step S78 where a noise processing similar to the step S74 is performed. Then, step S79 is entered where the predicted azimuth $\theta$pn ($\theta$pa) is set as the azimuth $\theta$n ($\theta$a) of the expected reference point A in a reference point missing process.

On the other hand, if the difference is smaller than the limited angle $\Delta\theta$ in step S75, it is decided that the detected azimuth $\theta$s is that of the expected reference A, and step S76 is entered. In step S76, based on the azimuth $\theta$n determined in the last processing and the azimuth $\theta$s determined in the current processing, the predicted azimuth in which the same reference point is to be detected in the next processing is calculated in accordance with the computation formula, $\{\theta s+(\theta s-\theta n)\}$.

In step S77, the azimuth $\theta$n is renewed with the angle $\theta$s. In step S80, a sum angle obtained by adding the predetermined angle $\theta$h to the predicted azimuth $\theta$pn + 1 calculated at a time of detecting reference point B in the last scan is set as the next reference point discrimination azimuth pn + 1 (in this example, pb)

In step S81, the light reception flag is reset. In step S82, the data stored in the second azimuth memory means 12 is deleted. In step S83, it is determined whether or not the pole counter is "4". The value "4" is the total number of reference points in the present example, and this value is preset depending on the total number of the reference points disposed. If the number n of the reference points matches with the pole counter, "0" is set in the pole counter in step S84 and control is returned to the main routine shown in FIG. 3.

When the pole counter is "1", the pole counter is incremented to "2" by step S70 in the next processing and the discrimination process of the reference point B is performed in the similar manner. Thereafter, the discrimination process of the reference point C and D is similarly performed.

As described above, in the present embodiment, if the light signals are detected a number of times greater than a predetermined number of times in each of four different azimuths corresponding to the number of reference points before the traveling of moving vehicle 1, it is determined that the four azimuths are those of the predetermined reference points viewed from the moving vehicle.

In addition, two of high and low threshold values are set as the predetermined numbers of times, azimuths each having a high detection frequency so that light signals detected a number of times greater than the high threshold value are determined to be the azimuths of the predetermined reference points viewed from the moving vehicle.

Although, in the present embodiment, the decision criterion of unrecognizable reference points is that the total number of detection times of light signals has reached a predetermined number of times (which is 50) before the determination of a predetermined number of reference points, instead such decision criterion may be that the means for scanning a light beam in the circumferential direction, namely, rotary portion 2a has rotated a predetermined number of times or more.

Further, the present invention can also be applied if any other light beam scan locuses are taken without departing from the idea of the present invention.

As apparent from the above description, the following technical advantages can be obtained by the present invention.

(1) It is not required to stop the vertical scan of a light beam and move the moving vehicle to a position at which all the reflectors can be detected, nor to adjust the inclination of the center axis for scanning the light beam in the reference point recognition process prior to the traveling. Consequently, if the reference point recognition process prior to the traveling is performed by substantially the same light beam scan as that during the continuous traveling, the work can easily be started even in a state in which the moving vehicle is inclined. For instance, if the work is stopped in a state in which the moving vehicle is inclined, the subsequent resumption of the work is easy.

(2) When a light beam is irradiated in a wave-like scan locus, the frequency of receiving the lights reflected from each of predetermined reflecting means having large reflecting surfaces which are disposed for light reflection becomes higher than the frequency of receiving the reflected lights from other wrong reflecting objects having small reflecting surfaces by chance. Thus, in accordance with the present invention wherein the reference points are discriminated by the frequency of receiving the reflected lights, it becomes less that the lights reflected from other wrong reflecting objects each having a reflective surface smaller than the retroreflecting means disposed at the reference points, namely, noises are erroneously recognized to be the lights reflected from the predetermined reflecting means.

(3) When the position of the moving vehicle vertically scanning a light beam before the traveling is previously known, the detection of the number of azimuths or directions in which the lights can be detected more than a predetermined number of times allows the azimuths or directions of the missing light reflecting means to reversely be calculated and estimated for recognizing the direction of each light reflecting means on basis of the position of the moving vehicle itself and the positions of the light reflecting means that can be detected, even if the number of the directions is smaller than the number of the disposed light reflecting means.

What is claimed is:

1. A reference point recognition apparatus for a steering control system of a moving vehicle wherein a light beam is scanned in the circumferential direction around the moving vehicle while being vertically swung, light beams reflected by a plurality of light reflecting means disposed at reference points remote from the moving vehicle are received to measure the azimuths of the light reflecting means as viewed from the moving vehicle, and the moving vehicle is made to travel along a predetermined path on the basis of the obtained azimuths and a positional information of the reference points, the reference point recognition apparatus comprising:
    means for detecting the azimuths of light detected by a beam receiver during a plurality of circumferential light beam scans performed prior to the start of the traveling of the moving vehicle,
    means for storing the detected azimuths and the number of times light has been detected in each of the detected azimuths,
    means for detecting that the number of times light has been detected in each of particular azimuths stored in the memory means has reached a predetermined value,
    means for determining that said particular azimuths are the azimuths of light reflecting means disposed at said reference points when lights have been detected more than said predetermined number of times in said particular azimuths; and
    means for starting the traveling of the moving vehicle after lights have been detected more than said predetermined number of times in said particular azimuths.

2. A reference point recognition apparatus for a moving vehicle as set forth in claim 1 which further comprises means for recognizing, when the number of said particular azimuths is equal to the number of said disposed light reflecting means, the respective azimuths as those of said disposed light reflecting means.

3. A reference point recognition apparatus for a moving vehicle as set forth in claim 1 which further comprises means for sorting the azimuths in which a light has been detected more than a predetermined number of times and which have been recognized to be the azimuths of the disposed light reflecting means according to their values.

4. A reference point recognition apparatus for a moving vehicle as set forth in claim 1 which further comprises means for outputting a signal indicating that the reference points are unrecognizable if the number of the azimuths in each of which the number of times the light signal has been detected more than the predetermined value is larger than the number of the disposed light reflecting means in the light beam scanning process performed prior to the traveling of the moving vehicle.

5. A reference point recognition apparatus for a moving vehicle as set forth in claim 1 which further comprises means for outputting a signal indicating that the reference points are unrecognizable if the number of disposed light reflecting means are not recognized when the light beam scan performed prior to the traveling of the moving vehicle has exceeded a second predetermined number of times.

6. A reference point recognition apparatus for a moving vehicle as set forth in claim 1 which further comprises means for determining that the reference points are unrecognizable if the number of disposed light reflecting means are not recognized when the number of lights detected during the light beam scan performed prior to the traveling of the moving vehicle has exceeded the predetermined number.

7. A reference point recognition apparatus for a moving vehicle as set forth in claim 1 comprising means for setting a third predetermined number of times of light detection that is smaller than said predetermined number of times of light detection, and means for outputting a signal indicating that the reference points are unrecognizable if the number of azimuths having reached the third predetermined number of times of light detection is larger than the number of the disposed light reflecting means after the azimuths have been recognized.

8. A reference point recognition apparatus for a moving vehicle as set forth in claim 1 wherein the light reflecting means are disposed at at least three reference points remote from the vehicle.

* * * * *